United States Patent
Luecke et al.

(10) Patent No.: US 12,233,525 B2
(45) Date of Patent: Feb. 25, 2025

(54) WORKING APPARATUS HAVING A TUBULAR PART AND A CABLE ARRANGEMENT, AND ASSEMBLY METHOD

(71) Applicant: Andreas Stihl AG & Co. KG, Waiblingen (DE)

(72) Inventors: Johannes Luecke, Waiblingen (DE); Jens-Peter Kern, Waiblingen (DE); Johanna Koch, Ludwigsburg (DE); Matthias Maier, Waiblingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 219 days.

(21) Appl. No.: 16/951,490

(22) Filed: Nov. 18, 2020

(65) Prior Publication Data
US 2021/0146522 A1    May 20, 2021

(30) Foreign Application Priority Data
Nov. 19, 2019   (EP) .................................... 19209978

(51) Int. Cl.
  *B25F 5/02*    (2006.01)
  *H01R 13/73*   (2006.01)
  (Continued)

(52) U.S. Cl.
  CPC ............... *B25F 5/02* (2013.01); *H01R 13/73* (2013.01); *A01D 34/90* (2013.01); *A01G 3/085* (2013.01)

(58) Field of Classification Search
  CPC ................................... B25F 5/02; A01G 3/085
  (Continued)

(56) References Cited

U.S. PATENT DOCUMENTS 3,879,573 A * 4/1975 Ehrlich .................. A01G 3/067
                                                403/372
5,446,964 A   9/1995 Woods et al.
  (Continued)

FOREIGN PATENT DOCUMENTS

CN     203500664 U    3/2014
CN     104245239 A   12/2014
  (Continued)

OTHER PUBLICATIONS

Chinese-language Office Action issued in Chinese Application No. 202011300945.7 dated Oct. 27, 2023 with partial English translation (10 pages).

(Continued)

*Primary Examiner* — Robert F Long
*Assistant Examiner* — Xavier A Madison
(74) *Attorney, Agent, or Firm* — Crowell & Moring LLP (57) ABSTRACT

A working apparatus has a manual operating region, a tubular part extending away from the manual operating region, and an electric cable arrangement in the tubular part. The working apparatus includes a rod-shaped cable holder, which is inserted into and held in the tubular part and has a cable holding arrangement, by which the cable arrangement is held in a pre-mounted manner on the cable holder. An assembly method secures the cable arrangement on the cable holder by the cable holding arrangement, and inserts the cable holder, with the cable arrangement held thereon, into the tubular part. The working apparatus may be a battery-operated, hand-guided garden or forestry working apparatus.

20 Claims, 6 Drawing Sheets

(51) Int. Cl.
*A01D 34/90* (2006.01)
*A01G 3/08* (2006.01)

(58) Field of Classification Search
USPC ........................................................ 173/217
See application file for complete search history.

(56) References Cited

U.S. PATENT DOCUMENTS

| | | | | |
|---|---|---|---|---|
| 5,809,653 | A * | 9/1998 | Everts | B25F 5/02 |
| | | | | 30/208 |
| 6,014,812 | A | 1/2000 | Webster | |
| 9,198,347 | B2 * | 12/2015 | Nagahama | A01D 34/78 |
| 9,333,636 | B2 * | 5/2016 | Yamada | A01D 34/90 |
| D758,150 | S | 6/2016 | Tinius | |
| 2015/0026988 | A1 | 1/2015 | Kurzenberger et al. | |
| 2015/0027745 | A1 | 1/2015 | Kurzenberger et al. | |
| 2015/0034347 | A1 | 2/2015 | Hess et al. | |
| 2016/0278288 | A1 * | 9/2016 | Yamaoka | A01D 34/81 |
| 2017/0079215 | A1 * | 3/2017 | Bian | A01G 3/085 |
| 2019/0091848 | A1 | 3/2019 | Walker | |
| 2021/0146522 | A1 * | 5/2021 | Luecke | H01R 13/73 |

FOREIGN PATENT DOCUMENTS

| | | |
|---|---|---|
| CN | 104339033 A | 2/2015 |
| CN | 104339421 A | 2/2015 |
| CN | 106064369 A | 11/2016 |
| CN | 109311146 A | 2/2019 |
| DE | 10 2013 223 819 A1 | 5/2015 |
| JP | 2016-202122 A | 12/2016 |

OTHER PUBLICATIONS

Chinese-language Office Action issued in Chinese Application No. 202011300945.7 dated May 30, 2024 with partial English translation (9 pages).

* cited by examiner

WORKING APPARATUS HAVING A TUBULAR PART AND A CABLE ARRANGEMENT, AND ASSEMBLY METHOD

CROSS REFERENCE TO RELATED APPLICATION

This application claims priority under 35 U.S.C. § 119 from European Patent Application No. 19209978.6, filed Nov. 19, 2019, the entire disclosure of which is herein expressly incorporated by reference.

BACKGROUND AND SUMMARY OF THE INVENTION

The invention relates to a working apparatus having a manual operating region, a tubular part extending away from the manual operating region, and an electric cable arrangement in the tubular part, and to an associated assembly method.

Working apparatuses of this kind are common, for example, as hand-guided, i.e. hand-held or guided by hand and supported on the ground, preferably motor-operated, working equipment for garden and/or forestry work, inter alia as hedge cutters, shaft pruners, brush cutters, hedging shears, leaf blowers, sweepers, power saws, lawnmowers and scarifiers, wherein an internal combustion engine or a battery-powered electric motor is used as a motor drive.

One or more operating elements, which the user can activate by hand to operate the working apparatus, are situated in the manual operating region. The manual operating region preferably also serves to enable the user to grip the apparatus there in order to carry or guide it. The electric cable arrangement serves to transmit electric currents, in particular for signal transmission, data transmission and/or power transmission. The cable arrangement runs in the tubular part and, depending on the application, additionally axially beyond the tubular part at one or both ends of the latter. In typical uses, the cable arrangement comprises, for example, cable connections between the manual operating region, or operating elements situated there, and an apparatus control unit, and/or between the apparatus control unit and a drive motor, and/or between the apparatus control unit and a display unit, and/or between the manual operating region and the display unit.

The tubular part extending away from the manual operating region can be a shaft tube of an apparatus shaft, for example, which working apparatuses of the so-called shaft apparatus type have, in which typically two apparatus parts are each arranged in one of the two axial end regions of the apparatus shaft. These apparatus parts can be, in particular, those which include a working tool and/or a drive motor and/or an electric battery unit for an electric drive motor.

As an alternative, the tubular part can also be, for example, a handle tube of an operating handle shaft which includes the manual operating region and is held on the apparatus shaft of a working apparatus of the shaft apparatus type at a location between the axial end regions thereof and projects from the apparatus shaft. In all the above-mentioned embodiments, the tubular part may extend only as far as the manual operating region or into the manual operating region or largely through the manual region, depending on requirements and the application. On working apparatuses for garden and/or forestry work, this version of an operating handle is often embodied by an operating handle structure similar to a bicycle handlebar fixed on the apparatus shaft, and this is accordingly also often referred to as a bike handlebar grip.

In one embodiment version of working apparatuses of the shaft apparatus type, there is a working tool and an associated electric drive motor in the front shaft end region, and an electric battery unit for supplying power to the drive motor in the rear shaft end region, wherein an electric cable is passed through the apparatus shaft from the battery unit to the drive motor. An apparatus of this kind is disclosed in Laid-open publication JP 2016-202122 A2, wherein there a sleeve made of flexible material is inserted between the cable and the inner wall of the shaft tube in order to prevent noise generation and damage to the cable. Another cable arrangement is guided from a manual operating region of a bike handlebar grip outside the shaft tube to the rear apparatus part.

Laid-open publication US 2016/0278288 A1 discloses a grass trimmer of the shaft apparatus type, wherein a battery unit and a control unit are arranged in a rear apparatus part, and an electric drive motor and an associated working tool are arranged in a front apparatus part. A shaft tube extends between the two apparatus parts at the ends, and a manual operating region adjoins the rear apparatus part towards the front and surrounds the shaft tube. In the shaft tube, a first electric cable extends from the control unit to a speed regulator arranged in the manual operating region, and a second electric cable runs from the control unit to the motor. A clip structure, by means of which the first electric cable can be held clipped in this region, is formed on the inner wall of the shaft tube, along the manual operating region.

Another working apparatus of the type stated at the outset is marketed by the applicant as a hedge cutter of the shaft apparatus type under the model name HLA 56. A battery pack is arranged in the rear apparatus part, and the electric motor and the cutting working tool are situated on the front apparatus part. A manual operating region surrounding the shaft tube adjoins the rear apparatus part towards the front. In order to protect the cable arrangement from damage due to operating elements which extend inwards into the shaft tube through a respective through opening in the shaft tube when actuated, a rod-shaped cable guide, which acts as a separator between the cable arrangement and the region of engagement of the operating elements into the shaft tube, extends from the rear apparatus part into this section of the manual operating region. During the production assembly of this apparatus, the cable arrangement is first of all placed in the shaft tube, and the rod-shaped cable guide is then inserted into the corresponding region of the shaft tube.

It is the object of the invention to provide a working apparatus of the type stated at the outset which offers advantages over the abovementioned prior art, especially as regards the cable arrangement in the tubular part. It is another object of the invention to provide an advantageous method for assembling a working apparatus of this kind.

The invention achieves these and other objects by providing a working apparatus which comprises a manual operating region, a tubular part extending away from the manual operating region, and an electric cable arrangement in the tubular part, and a rod-shaped cable holder, which is inserted into and held in the tubular part and has a cable holding arrangement by which the cable arrangement is held in a pre-mounted manner on the cable holder, and further by providing a method for assembling such working apparatus, wherein by this method the cable arrangement is secured on the cable holder by means of the cable holding arrangement, and the cable holder, with the cable arrangement held thereon, is then inserted into the tubular part. Advantageous developments of the invention are mentioned in the dependent claims, the wording of which is hereby incorporated by reference into the description.

By virtue of the cable holding arrangement, the cable holder of the working apparatus of the invention is capable not only of guiding but also holding the electric cable arrangement. Here, the rod shape implies, in particular, that the length of the cable holder in a longitudinal direction is greater than its width in a transverse direction perpendicular thereto. By virtue of its rod shape, the cable holder is suitable for being inserted into the tubular part and for holding the cable arrangement along its corresponding rod length. In this case, the cable arrangement can advantageously be pre-mounted on the cable holder, i.e. the cable arrangement is first of all secured on the cable holder before the cable holder is moved into its position in the tubular part.

This characteristic of the cable holder is exploited by the assembly method according to the invention in that, according to this method for assembling the working apparatus, the cable arrangement is first of all secured on the cable holder by means of the cable holding arrangement, and the cable holder, with the cable arrangement held thereon, is then inserted into the tubular part. This allows relatively simple assembly in this stage of the production of the working apparatus. Moreover, these measures according to the invention create good preconditions for further advantageous optimizations in respect of the guidance and holding of the cable arrangement and the associated production assembly steps. By means of the cable holder, the cable arrangement can be protected in an advantageous manner from damage, both during assembly and in the use of the working apparatus.

In a development of the invention, the tubular part extends into the manual operating region and/or extends through the latter, and the manual operating region has an operating element that can be moved by manual actuation, wherein the tubular part comprises in the circumference a through opening, through which the operating element extends, at least in an associated actuating position. For this type of apparatus, the cable holder offers the advantage that, precisely also in that section of the tubular part which contains the through opening, it can hold and not just guide the cable arrangement in a suitable position, in which the cable arrangement is kept away from the region of engagement of the operating element right through the through opening. Depending on requirements and the embodiment, the manual operating region can have one or more further operating elements which can be moved by manual actuation and to which in each case a further circumferential through opening in the tubular part can correspond.

In a development of the invention, the cable holder has a plug connector mount for a plug connector, connected to the cable arrangement, of an electric plug connection. This advantageously allows pre-mounting of the cable arrangement together with the plug connector on the cable holder. The plug connector can thus be pre-mounted on the cable holder in a simple and easily accessible manner before the holder has been inserted into the tubular part, and can then be inserted into the tubular part together with the cable holder.

In one embodiment of the invention, the plug connector mount is designed to hold the plug connector with a plug-in direction extending transversely to a longitudinal direction of the cable holder, and the tubular part has in the circumference a passage opening, through which a mating plug connector, interacting with the plug connector, of the electric plug connection can be passed. This makes it possible in an advantageously simple manner to produce the electric plug connection after the fitting of the cable holder with the plug connector pre-mounted thereon into the tubular part. For this purpose, the mating plug connector can be joined to the plug connector in a simple manner through the passage opening of the tubular part.

In a development of the invention, the cable holder has a ferrite core mount for an electric ferrite core component connected to the cable arrangement. This is advantageous particularly for working apparatuses in which a ferrite core component of this kind is provided. By virtue of the ferrite core mount, it is possible to pre-mount this ferrite core component on the cable holder before the cable holder is then inserted together with the pre-mounted ferrite core component into the tubular part.

In a development of the invention, the working apparatus comprises an apparatus shaft, which comprises the manual operating region and the tubular part as a shaft tube extending into the manual operating region and/or through the manual operating region, a first apparatus part in a first axial end region of the apparatus shaft, and a second apparatus part in a second axial end region of the apparatus shaft, wherein the manual operating region is situated between the two apparatus parts. This development is advantageous particularly for the implementation of working apparatuses of the shaft apparatus type in which the manual operating region surrounds the shaft tube in a corresponding shaft tube section, e.g. adjoining a rear part of the two apparatus parts and extending forwards from said part.

In an alternative development of the invention, the working apparatus comprises an apparatus shaft, a first apparatus part in a first axial end region of the apparatus shaft, a second apparatus part in a second axial end region of the apparatus shaft, and an operating handle shaft, which is held on the apparatus shaft at a location between the first and the second axial end region, projects from the apparatus shaft and comprises the manual operating region and the tubular part as a handle tube. This development is suitable particularly for the implementation of working apparatuses of the shaft apparatus type which have a bike handlebar grip or bike handlebar construction.

In one embodiment of the invention for working apparatuses of the shaft apparatus type, it is envisaged that the first apparatus part forms a front apparatus part and comprises an working tool, wherein a drive motor arranged in the first or in the second apparatus part is provided for the working tool. If the drive motor and the working tool are in different apparatus parts, a drive shaft or the like for power transmission from the drive motor to the working tool is additionally provided in the shaft tube in an essentially conventional manner.

In one embodiment of the invention, an electric battery unit in the second apparatus part serves as an electric power source for the drive motor, which in this case is an electric drive motor. If the battery unit and the drive motor are in different apparatus parts, the cable arrangement comprises an electric power cable for supplying power from the battery unit to the drive motor.

In a development of the invention, the working apparatus is designed as a hand-guided garden or forestry working apparatus and, in particular, this can be a hand-held or a ground-supported and only hand-guided apparatus.

In a development of the invention, in the course of the assembly method, after the cable holder has been inserted, the tubular part is inserted into an associated tube receptacle of the manual operating region. During this process, the tubular part is inserted only up to a certain point in the interior of the manual operating region or alternatively through the entire manual operating region, depending on requirements and the application.

Other objects, advantages and novel features of the present invention will become apparent from the following detailed description of one or more preferred embodiments when considered in conjunction with the accompanying drawings.

DETAILED DESCRIPTION OF THE DRAWINGS

Figures 1, 2:
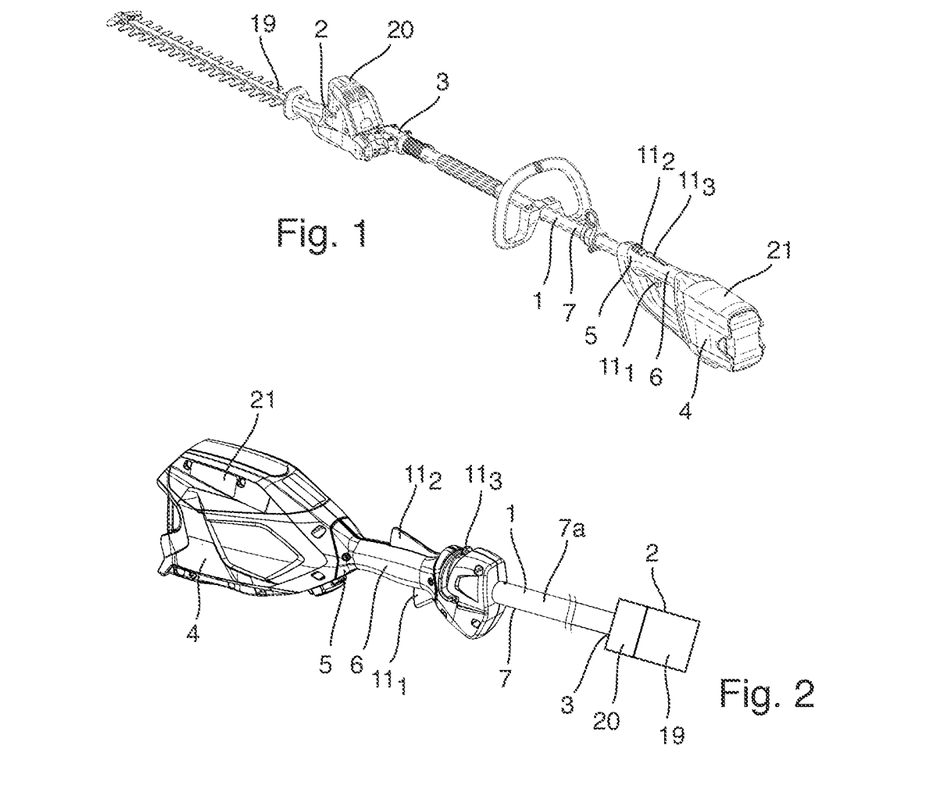
FIG. 1 shows a perspective view of a hedge cutter.
FIG. 2 shows a partially schematic perspective view of a working apparatus of the shaft apparatus type.
Figure 12:
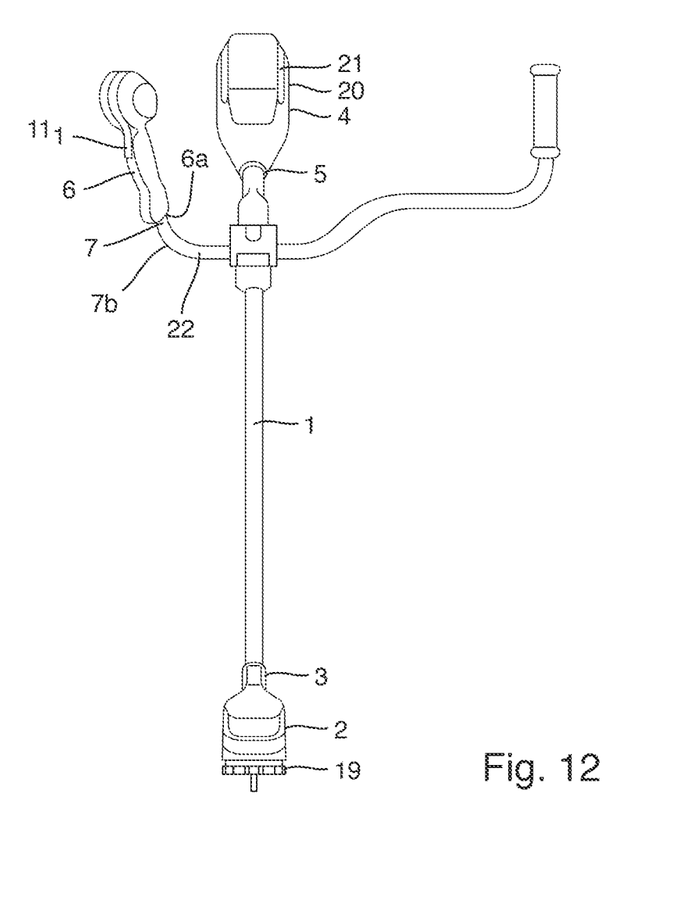
FIG. 12 shows a perspective view of a grass trimmer of the shaft apparatus type with a bike handlebar construction.

FIGS. 1 and 2 show working apparatuses of the shaft apparatus type, wherein the working apparatus in FIG. 2 can be, in particular, a hand-guided garden or forestry working apparatus or, alternatively, some other working apparatus and, more specifically, FIG. 1 shows a hedge cutter. FIG. 12 illustrates more specifically a working apparatus in the form of a grass trimmer of the shaft apparatus type with a bike handlebar construction. In advantageous embodiments, the working apparatus is a hand-held garden or forestry working apparatus or, alternatively, it is embodied as a ground-supported and only hand-guided working apparatus.

The working apparatuses shown each comprise a manual operating region 6, a tubular part 7 extending away from the manual operating region 6, an electric cable arrangement 8 in the tubular part 7, and a rod-shaped cable holder 9, which is inserted into the tubular part 7 and held therein and has a cable holding arrangement 10, by means of which the cable arrangement 8 is held in a pre-mounted manner on the cable holder 9. In the overall views in FIGS. 1, 2 and 12, the cable arrangement 8 and the cable holder 9 are not visible, but they are visible in FIGS. 3 to 11, which illustrate advantageous implementations of the apparatus in FIG. 2, wherein the embodiments of the cable arrangement 8 and the cable holder 9 which are illustrated in FIGS. 3 to 11 may likewise be part of the apparatuses in FIGS. 1 and 12. By virtue of its rod shape, the cable holder 9 can be inserted into the tubular part 7, and, with its cable holding arrangement 10, it is capable of holding the cable arrangement 8 in a desired manner along its rod length.

This design of the cable holder 9 makes it possible, during the assembly of the working apparatus in a corresponding method step, to secure the cable arrangement 8 on the cable holder 9 by means of the cable holding arrangement 10 and thereby pre-mount it on the cable holder 9, and then to fit the cable holder 9, with the cable arrangement 8 held thereon, into the tubular part 7. At this stage of production, this simplifies the assembly of the working apparatus, wherein the guidance and holding of the cable arrangement 8 in the region of the working apparatus in which the cable holder 9 extends can be optimized by the cable holder 9. By means of the cable holder 9, the cable arrangement 8 can be protected in an advantageous manner from damage not only during this assembly but also in the subsequent use of the working apparatus.

The cable holding arrangement 10 can comprise one or more conventional cable clamping elements or cable clip elements or cable tie elements or the like, for example, which are preferably provided at a number of mutually spaced holding positions along the longitudinal extent of the cable holder 7.

Figure 3:
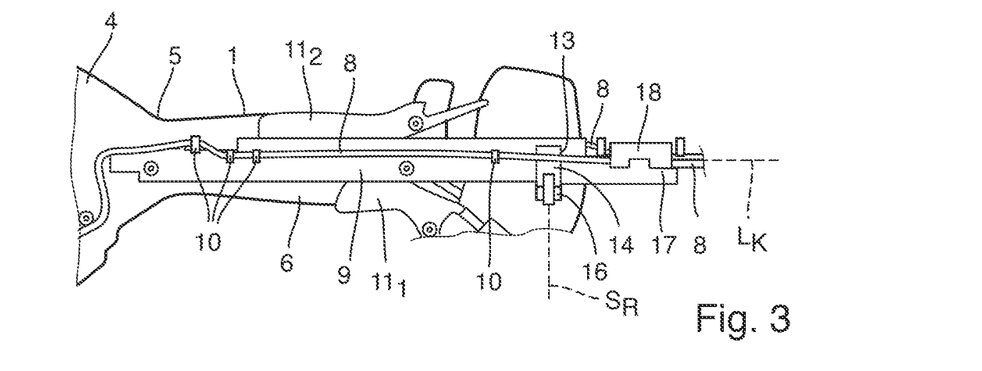
FIG. 3 shows a partial longitudinally sectioned view of the apparatus in FIG. 2 in the vicinity of a manual operating region.
Figure 5:
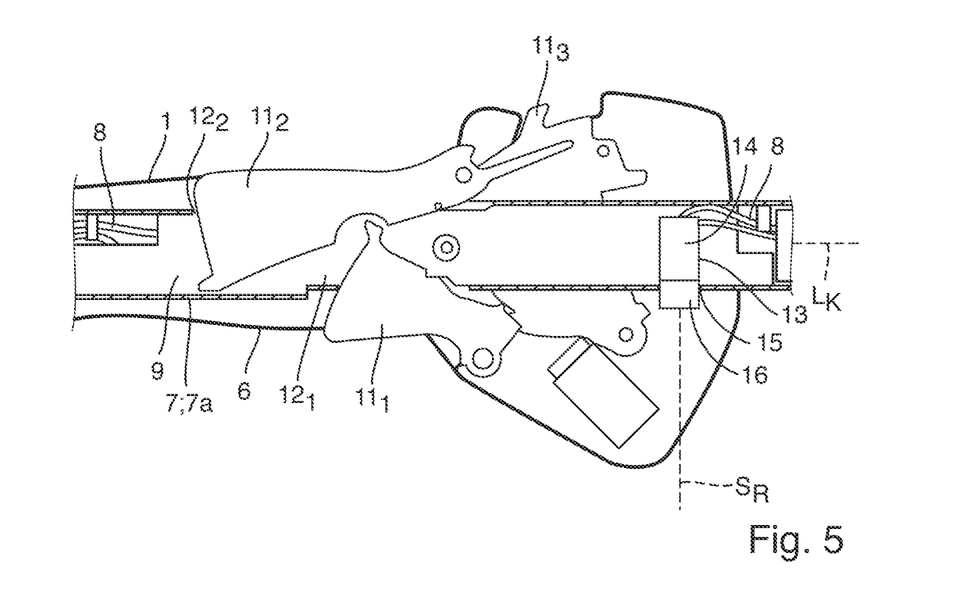
FIG. 5 shows a longitudinally sectioned view of the apparatus in FIG. 2 in a front part of the manual operating region.
Figure 6:
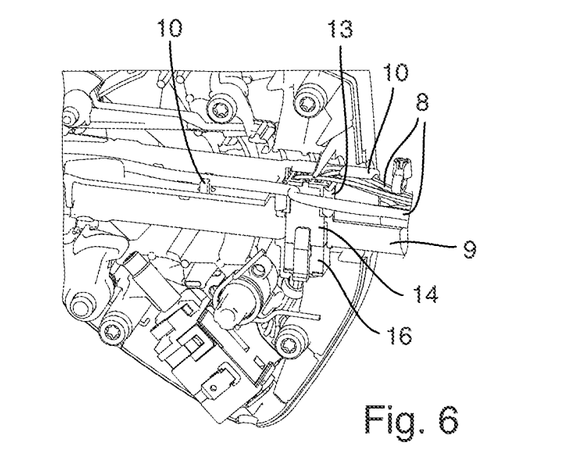
FIG. 6 shows a longitudinally sectioned view of the apparatus in FIG. 2 in the region of an electric plug connection in the manual operating region.

In advantageous embodiments, the tubular part 7 extends through the manual operating region 6, as in the examples shown, wherein the manual operating region 6 has an operating element 111 that can be moved by manual actuation, and the tubular part 7 comprises in the circumference a through opening 121, through which the operating element 111 extends, at least in an associated actuating position such as that shown in FIGS. 3 and 5. In this case, the cable holder 9 can ensure that, in the region of the through opening 121, the cable arrangement 8 is held outside the region of engagement of the operating element 111 into the through opening 121. In alternative embodiments, the tubular part 7 extends only into the manual operating region 6 and, in other alternative embodiments, the tubular part 7 extends only outside the manual operating region 6.

In corresponding embodiments, the cable holder 9 has, as in the examples shown, a plug connector mount 13 for a plug connector 14, connected to the cable arrangement 8, at an electric plug connection. The plug connector 14 is preferably pre-mounted on the plug connector mount 13 as part of the pre-mounting of the cable arrangement 8 on the cable holder 9, as long as the cable holder 9 has not already been inserted into the tubular part 7, and therefore the plug connector 14 and the plug connector mount 13 are easily accessible. Subsequently, the plug connector 14 pre-mounted on the plug connector mount 13 can then be inserted into the tubular part 7, together with the cable arrangement 8 and the cable holder 9. In alternative embodiments, the cable holder 9 does not have a plug connector mount of this kind.

Depending on requirements and the application, the plug connector mount 13 can be configured in such a way that it holds the plug connector 14 on the cable holder 9 in a clamped or clipped or screwed manner or in some other conventional manner of fastening.

In advantageous implementations, as in the exemplary embodiments shown, the plug connector mount 13 is designed to hold the plug connector 14 with a plug-in direction SR extending transversely to a longitudinal direction LK of the cable holder 9, wherein the plug-in direction SR is perpendicular to the longitudinal direction LK of the cable holder 9 or encloses an acute angle therewith, between 45° and 90° in corresponding cases. In the circumference, the tubular part 7 has a passage opening 15, through which a mating plug connector 16 of the electric plug connection can be passed, said mating connector interacting with the plug connector 14. It is thereby possible in a simple manner to establish the electric plug-in connection only after the cable holder 9 has been inserted into the tubular part 7, for which purpose the mating plug connector 16 is inserted into the plug connector 14 or joined to the latter through the passage opening 15 of the tubular part 7. In alternative embodiments, the plug-in direction SR of the plug connector 14 is parallel to the longitudinal direction LK of the cable holder 9.

Figure 4:
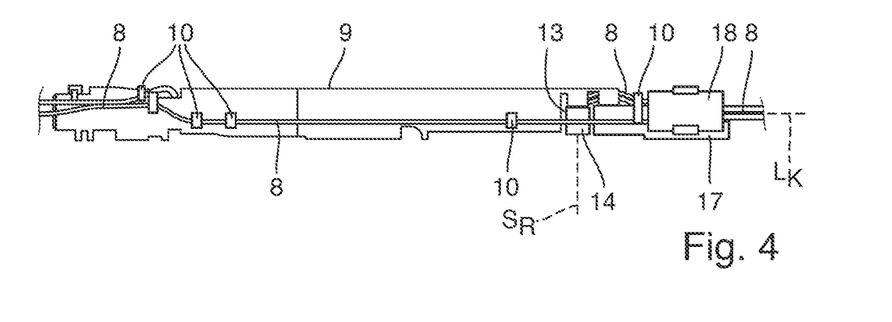
FIG. 4 shows a side view of a cable holder with a pre-mounted cable arrangement and a pre-mounted ferrite core component.

In corresponding embodiments, the cable holder 9 comprises a ferrite core mount 17 for an electric ferrite core component 18 of the kind that can be seen from FIGS. 3 and 4, which is connected to the cable arrangement 8. In this case, the ferrite core component 18 can be pre-mounted in an easily accessible manner on the cable holder 9 before said holder is inserted into the tubular part 7. The cable holder 9 can then be inserted into the tubular part 7 together with the ferrite core component 18. The ferrite core mount 17 can be implemented as any desired conventional, preferably releasable, mount suitable for this purpose, e.g. for the clamped, clipped or screwed holding of the ferrite core component 18. In alternative embodiments, the cable holder 9 does not have a ferrite core mount, as in the embodiment version in FIGS. 7, 8 and 10. These alternative embodiment versions are suitable particularly for working apparatuses which do not require a ferrite core component within the tubular part 7.

In advantageous embodiments, as in the exemplary embodiments in FIGS. 1 and 2, the working apparatus comprises an apparatus shaft 1, which comprises the manual operating region 6 and the tubular part 7 as a shaft tube 7a extending into the manual operating region 6 and/or through the manual operating region 6, a first apparatus part 1 in a first axial end region 3 of the apparatus shaft 1, and a second apparatus part 4 in a second axial end region 5 of the apparatus shaft 1, wherein the manual operating region 6 is situated between the two apparatus parts 2, 4. This embodiment of the apparatus is suitable particularly for the provision of working apparatuses of the shaft apparatus type in which the manual operating region 6 surrounds the shaft tube 7a in a corresponding shaft tube section, e.g. adjoining a rear apparatus part 4 of the two apparatus parts 2, 4 and extending forwards from this rear apparatus part 4, as in the case of the apparatuses in FIGS. 1 and 2.

In alternative embodiments, as in the exemplary embodiment in FIG. 12, the working apparatus comprises the apparatus shaft 1, the first apparatus part 2 in the first axial end region 3 of the apparatus shaft 1, the second apparatus part 4 in the second axial end region 5 of the apparatus shaft 1, and an operating handle shaft 22, which is held on the apparatus shaft 1 at a location between the first and the second axial end region 3, 5, projects from the apparatus shaft 1 and comprises the manual operating region 6 and the tubular part 7 as a handle tube 7b. This apparatus implementation is suitable particularly for the provision of working apparatuses of the shaft apparatus type which have a bike handlebar handle or bike handlebar construction, as is the case with the apparatus in FIG. 12.

In corresponding embodiments, as in the examples shown, the working apparatus comprises a working tool 19 in the first apparatus part 2, wherein the first apparatus part 2 forms a front apparatus part in the examples shown, and a drive motor 20 for the working tool 19, said motor being arranged in the first or in the second apparatus part 2, 4, wherein the second apparatus part 4 forms a rear apparatus part in the examples shown. By way of example, the drive motor 20 in the working apparatuses in FIGS. 1 and 2 is arranged on the front apparatus part 2, and is arranged on the rear apparatus part 4 in the working apparatus in FIG. 12, although, as an alternative, the other position of the drive motor 20 can be implemented in each case. If the working tool 19 and the drive motor 20 are situated in or on different apparatus parts 2, 4, a drive shaft for power transmission from the drive motor 20 to the working tool 19 runs in the apparatus shaft 1 or shaft tube 7a, as is customary.

In corresponding embodiments, as in the examples shown, the working apparatus comprises an electric battery unit 21 in the second apparatus part 4, e.g. the rear apparatus part, wherein the battery unit 21 serves as an electric power source for the drive motor 20. If the battery unit 21 and the drive motor 20 are in different apparatus parts 2, 4, the cable arrangement 8 typically comprises an electric power cable for supplying power from the battery unit 21 to the drive motor 20.

In the exemplary embodiments in FIGS. 1 to 11, the manual operating region 6 comprises two further operating elements 112, 113 that can be moved by manual actuation, and the tubular part 7 comprises in the circumference a further through opening 122, through which the operating element 112 extends, at least in an associated actuation position, which is shown in FIGS. 3 and 5. To this extent too, the cable holder 9 ensures that the cable arrangement 8 cannot get into the region of the through opening 122 and interfere with the operating actuation of the operating element 112 or be damaged by this operating movement. For this purpose, the cable holder 9 guides and holds the cable arrangement 8 in a suitable manner away from the through opening 122 in the tubular part 7. In FIGS. 2 and 9 to 11, the three operating elements 111, 112, 113 are shown in an unactuated initial position.

Figure 7:
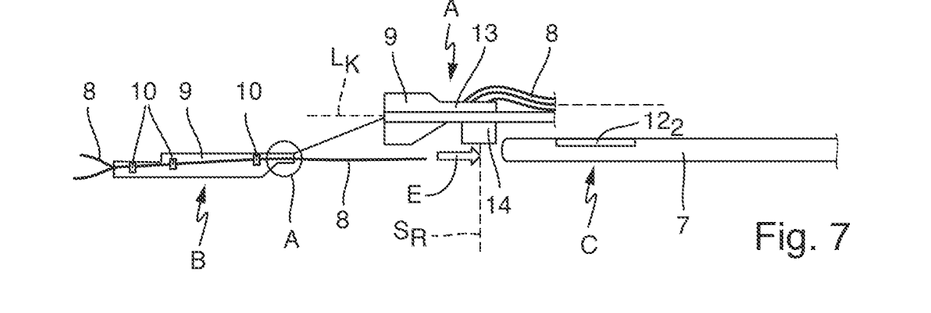
FIG. 7 shows an assembly illustration to illustrate an assembly sequence for the cable holder, the cable arrangement and a tubular part for a cable holder version modified in relation to that in FIG. 4.
Figure 8:
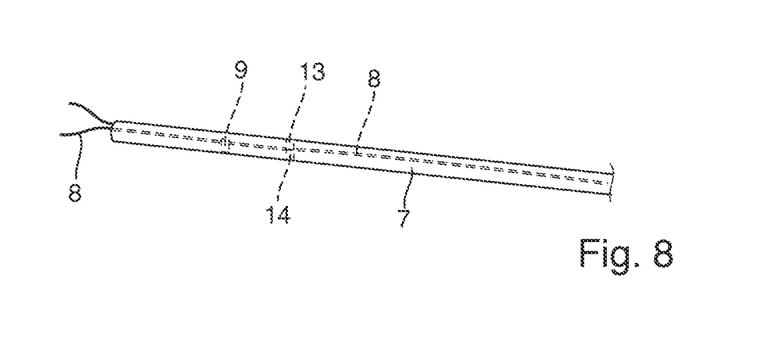
FIG. 8 shows the arrangement in FIG. 7 in the fully pre-assembled state.
Figure 9:
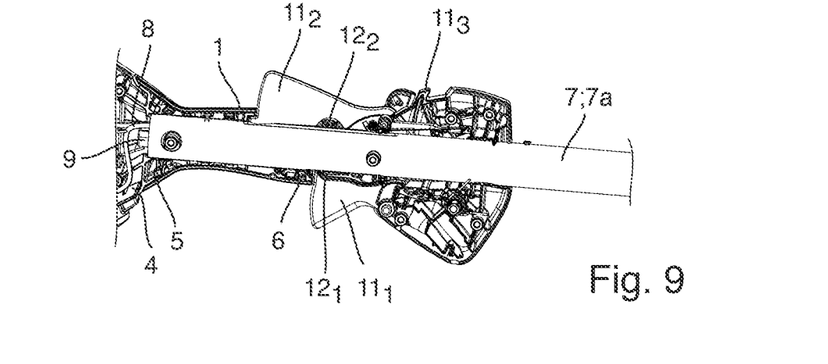
FIG. 9 shows a longitudinally sectioned view corresponding to FIG. 3 with a tubular part shown in addition.
Figure 10:
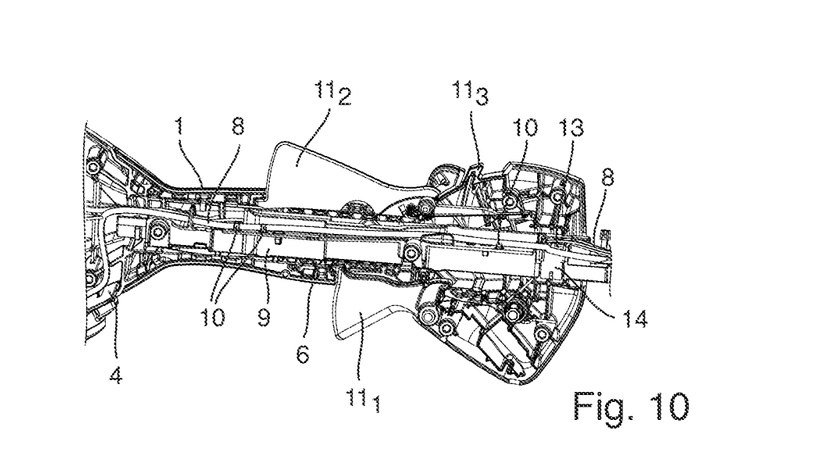
FIG. 10 shows the view of FIG. 9 without the tubular part for the cable holder version in FIG. 7.
Figure 11:
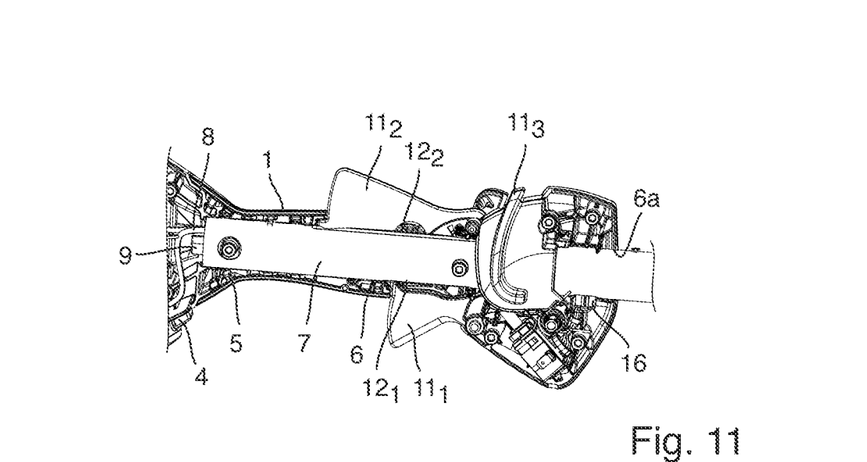
FIG. 11 shows the view of FIG. 9 with an additionally attached operating element in the manual operating region.

FIGS. 7 and 8 illustrate in somewhat more detail the assembly process relating to the tubular part 6, the cable holder 9 and the cable arrangement 8 for the embodiment considered there. First of all, the plug connector 14 of the cable arrangement 8 is mounted on the plug connector mount 13 of the cable holder 9, as represented as method step A in a corresponding partial exploded view in FIG. 7. The cable arrangement 8 is then secured on the cable holder 9 by means of the cable holding arrangement 10, as represented as method step B in a corresponding partial exploded view in FIG. 7. Alternatively, method steps A and B can be interchanged. The cable holder 9 with the cable arrangement 8 held thereon is then inserted into the tubular part 7 in the longitudinal direction LK of the cable holder 9 or of the tubular part 7, as represented by an associated insertion arrow E and as method step C in a corresponding partial exploded view in FIG. 7, resulting in the pre-assembled system shown in FIG. 8. After this, the tubular part 7 in corresponding embodiments is inserted into an associated tube receptacle 6a of the manual operating region 6 or, in other words, the manual operating region 6 is pushed onto the tubular part 7. The mounted position of the tubular part 7 in the manual operating region 6 can be seen from FIGS. 9 and 11, for example.

As the exemplary embodiments which are shown and the other exemplary embodiments mentioned above make clear, the invention makes available a working apparatus, in particular a working apparatus that can be used as a hand-guided garden or forestry working apparatus, which, in a very advantageous way, by means of a cable holder configured in a suitable manner for this purpose, makes possible defined holding and guidance and therefore a defined path of an electric cable arrangement in a tubular part of the apparatus, thus also making it possible in a simple manner to ensure that the cable arrangement does not interfere with the arrangement and functioning of any other components of the apparatus.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A working apparatus, comprising:
a manual operating region;
a tubular part extending away from the manual operating region;
an electric cable arrangement in the tubular part; and
a rod-shaped cable holder, which is inserted into and held in the tubular part, and on which a cable holding arrangement is configured to secure the electric cable arrangement on the rod-shaped cable holder such that the electric cable arrangement is pre-mounted and held on the rod-shaped cable holder at a location distant from terminal ends of the electric cable arrangement before being inserted,
wherein the cable holder has a plug connector mount for a plug connector, connected to the cable arrangement, of an electric plug connection.

2. The working apparatus according to claim 1, wherein
the tubular part extends into or through the manual operating region,
the manual operating region has a manually movable operating element, and
the tubular part comprises in its circumference a through opening, through which the operating element extends at least in an associated actuating position.

3. The working apparatus according to claim 1, wherein
the plug connector mount is configured to hold the plug connector with a plug-in direction extending transversely to a longitudinal direction of the cable holder, and
the tubular part has in its circumference a passage opening through which a mating plug connector, interacting with the plug connector, of the electric plug connection is capable to be passed.

4. The working apparatus according to claim 1, further comprising:
an apparatus shaft, which comprises the manual operating region and the tubular part as a shaft tube extending into or through the manual operating region;
a first apparatus part at a first axial end region of the apparatus shaft; and
a second apparatus part at a second axial end region of the apparatus shaft,
wherein the manual operating region is situated between the two apparatus parts.

5. The working apparatus according to claim 4, further comprising:
a working tool in the first apparatus part, wherein the first apparatus part forms a front apparatus part; and
a drive motor for the working tool, wherein the drive motor is arranged in the first or in the second apparatus part.

6. The working apparatus according to claim 5, further comprising:
an electric battery unit in the second apparatus part, which serves as an electric power source for the drive motor.

7. The working apparatus according to claim 1, further comprising:
an apparatus shaft;
a first apparatus part at a first axial end region of the apparatus shaft;
a second apparatus part in a second axial end region of the apparatus shaft; and
an operating handle shaft, which is held on the apparatus shaft at a location between the first and the second axial end region, projects from the apparatus shaft and comprises the manual operating region and the tubular part as a handle tube.

8. The working apparatus according to claim 7, further comprising:
a working tool in the first apparatus part, wherein the first apparatus part forms a front apparatus part; and
a drive motor for the working tool, wherein the drive motor is arranged in the first or in the second apparatus part.

9. The working apparatus according to claim 8, further comprising:
an electric battery unit in the second apparatus part, which serves as an electric power source for the drive motor.

10. The working apparatus according to claim 1, wherein the working apparatus is configured as a hand-guided garden or forestry working apparatus.

11. A working apparatus, comprising:
a manual operating region;
a tubular part extending away from the manual operating region;
an electric cable arrangement in the tubular part; and
a rod-shaped cable holder, which is inserted into and held in the tubular part, and on which a cable holding arrangement is configured to secure the electric cable arrangement on the rod-shaped cable holder such that the electric cable arrangement is pre-mounted and held on the rod-shaped cable holder at a location distant from terminal ends of the electric cable arrangement before being inserted,
wherein the cable holder has a ferrite core mount for an electric ferrite core component connected to the cable arrangement.

12. The working apparatus according to claim 11, wherein
the tubular part extends into or through the manual operating region,
the manual operating region has a manually movable operating element, and
the tubular part comprises in its circumference a through opening, through which the operating element extends at least in an associated actuating position.

13. The working apparatus according to claim 11, further comprising:
an apparatus shaft, which comprises the manual operating region and the tubular part as a shaft tube extending into or through the manual operating region;
a first apparatus part at a first axial end region of the apparatus shaft; and
a second apparatus part at a second axial end region of the apparatus shaft,
wherein the manual operating region is situated between the two apparatus parts.

14. The working apparatus according to claim 13, further comprising:

a working tool in the first apparatus part, wherein the first apparatus part forms a front apparatus part; and a drive motor for the working tool, wherein the drive motor is arranged in the first or in the second apparatus part.

15. The working apparatus according to claim 14, further comprising:

an electric battery unit in the second apparatus part, which serves as an electric power source for the drive motor.

16. The working apparatus according to claim 11, further comprising:

an apparatus shaft;

a first apparatus part at a first axial end region of the apparatus shaft;

a second apparatus part in a second axial end region of the apparatus shaft; and an operating handle shaft, which is held on the apparatus shaft at a location between the first and the second axial end region, projects from the apparatus shaft and comprises the manual operating region and the tubular part as a handle tube.

17. The working apparatus according to claim 16, further comprising:

a working tool in the first apparatus part, wherein the first apparatus part forms a front apparatus part; and a drive motor for the working tool, wherein the drive motor is arranged in the first or in the second apparatus part.

18. The working apparatus according to claim 17, further comprising:

an electric battery unit in the second apparatus part, which serves as an electric power source for the drive motor.

19. A method for assembling a working apparatus comprising a manual operating region, a tubular part extending away from the manual operating region, an electric cable arrangement in the tubular part, and a rod-shaped cable holder, which has a cable holding arrangement by which the electric cable arrangement is held on the rod-shaped cable holder, the method comprising:

pre-mounting the electric cable arrangement on the rod-shaped cable holder by securing the electric cable arrangement on the rod-shaped cable holder, via the cable holding arrangement, at a location distant from terminal ends of the electric cable arrangement; and inserting the rod-shaped cable holder, with the electric cable arrangement pre-mounted thereon, into the tubular part.

20. The method according to claim 19, wherein, after the cable holder has been inserted, the tubular part is inserted into an associated tube receptacle of the manual operating region.

* * * * *